US006894999B1

(12) United States Patent
Acharya (10) Patent No.: US 6,894,999 B1
(45) Date of Patent: May 17, 2005

(54) COMBINING VLAN TAGGING WITH OTHER NETWORK PROTOCOLS ALLOWS A USER TO TRANSFER DATA ON A NETWORK WITH ENHANCED SECURITY

(75) Inventor: Yatin Acharya, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 686 days.

(21) Appl. No.: 09/715,997

(22) Filed: Nov. 17, 2000

(51) Int. Cl.⁷ .............................................. H04L 12/66
(52) U.S. Cl. ....................... 370/352; 370/392; 370/401
(58) Field of Search ................................ 370/352, 231, 370/235, 389, 392, 395.53, 400, 401, 402; 709/220, 238, 245, 250, 321, 324, 327, 328; 713/201

(56) References Cited

U.S. PATENT DOCUMENTS

| | | | |
|---|---|---|---|
| 4,823,338 A | | 4/1989 | Chan et al. |
| 5,768,271 A | | 6/1998 | Seid et al. |
| 5,784,573 A | | 7/1998 | Szczepanek et al. |
| 5,959,990 A | * | 9/1999 | Frantz et al. ............... 370/392 |
| 5,978,378 A | * | 11/1999 | Van Seters et al. ......... 370/401 |
| 5,995,488 A | | 11/1999 | Kalkunte et al. |
| 6,016,318 A | | 1/2000 | Tomoike |
| 6,041,358 A | | 3/2000 | Huang et al. |
| 6,067,585 A | | 5/2000 | Hoang |
| 6,075,776 A | | 6/2000 | Tanimoto et al. |
| 6,079,020 A | * | 6/2000 | Liu ............................ 713/201 |
| 6,085,238 A | | 7/2000 | Yuasa et al. |
| 6,094,436 A | | 7/2000 | Runaldue et al. |
| 6,148,337 A | * | 11/2000 | Estberg et al. ............... 709/224 |
| 6,158,011 A | * | 12/2000 | Chen et al. .................. 713/201 |
| 6,173,399 B1 | * | 1/2001 | Gilbrech ...................... 713/153 |
| 6,226,748 B1 | * | 5/2001 | Bots et al. ................... 713/201 |
| 6,493,349 B1 | * | 12/2002 | Casey ......................... 370/409 |
| 6,526,052 B1 | * | 2/2003 | Rijhsinghani et al. ...... 370/389 |
| 6,526,581 B1 | * | 2/2003 | Edson .......................... 725/74 |
| 6,604,136 B1 | * | 8/2003 | Chang et al. ............... 709/223 |
| 6,614,800 B1 | * | 9/2003 | Genty et al. ................ 370/464 |
| 6,647,109 B1 | * | 11/2003 | Henderson .................. 379/219 |

OTHER PUBLICATIONS

AMD. "AM79C901 HomePHY (Single–Chip 1/10 Mbps Home Networking PHY)." URL: http://www.amd.com/products/npd/overview/homenetworking/22334.html.
Frank, Edward and Holloway, Jack. "Connecting the Home with a Phone Line Network Chip Set." Broadcom Corporation. IEEE MICRO Mar.–Apr. 2000: 27–38.
Claims for Appl. No. 09/715,443.
Claims for Appl. No. 09/716,854.
Claims for Appl. No. 09/750,878.
Claims for Appl. No. 09/769,982.
Claims for Appl. No. 09/769,890.
Claims for Appl. No. 09/770,060.
Claims for Appl. No. 09/774,292.
Claims for Appl. No. 09/776,195.
Claims for Appl. No. 09/776,339.

* cited by examiner

Primary Examiner—Chau Nguyen
Assistant Examiner—Albert T. Chou
(74) Attorney, Agent, or Firm—Renner, Otto, Boisselle & Sklar, LLP (57) ABSTRACT

A method of communicating between a phone line network which includes a plurality of devices coupled by a shared phone line medium, and a remote network. The method includes attaching a virtual local area network (VLAN) header to a data frame. The header's contents indicate that the data frame may be transmitted within a virtual network (VLAN) indicated by an identifier field of the VLAN header. The VLAN includes at least part of the phone line network and at least part of the remote network. The data frame is transmitted within the VLAN which includes a network connection between the network and the remote network.

12 Claims, 5 Drawing Sheets

COMBINING VLAN TAGGING WITH OTHER NETWORK PROTOCOLS ALLOWS A USER TO TRANSFER DATA ON A NETWORK WITH ENHANCED SECURITY

BACKGROUND OF THE INVENTION

1. Technical Field

The invention relates to the field of data communications. More specifically, the present invention relates to a method of securing access to data during transmission by using a virtual LAN (VLAN) header in combination with other network protocols.

2. Description of the Related Art

Computers and the like can be networked in private networks, local area networks (LANs), wide area networks (WANs), intranets, internets, virtual LANs (VLANs), virtual private networks (VPNs), etc. and can be accessed remotely by a plurality of remote access methods. While networking allows quick access and the ability to transfer data stored on networked devices, it invites attack. Network designers design in proprietary security features to protect against such attacks. These security features are especially needed by users who use remote access to LANs in order to access and transfer data, however the proprietary nature of these security features make it difficult to combine security features designed by various vendors.

Although several vendors have developed phone line LANs based on the Home Phone Networking Alliance (HPNA) protocols which allow users to merely plug their computers or peripheral devices (nodes) into the nearest phone jack without disrupting normal phone service, remote access systems have not been designed to securely connect phone line LANs using multiple protocols. Further, remote access systems have not used virtual LAN identification information to secure the data transmitted from one segment phone line LAN to another remote network.

Network interface devices which are capable of communicating data over a phone line LAN are available. Such devices are used to connect the nodes to the network. However, phone line LANs using the standard HPNA protocols do not provide a means for segmenting the phone line LAN into virtual subnets (VLANs) or allow remote access to a computer device on an office LAN. Traditional LANs as well as phone line LANs do not allow for the combination of VLAN protocols with other network protocols when identifying a networks topology to enhance security.

Therefore, there is a strong need in the art for a method which would allow the seamless combining of network protocols with VLAN tagging to secure data transferred on a phone line LAN as well as between a device on a phone line LAN and a device on a remote network.

SUMMARY OF THE INVENTION

The present invention is a method of securing data transferred either locally within a physical phone line LAN by segmenting the physical phone line LAN into virtual subnets using network protocols in combination with VLAN tagging, or remotely between a device on such a segmented phone line LAN and a device on a remote network.

VLANs can be seen as analogous to a group of nodes perhaps on multiple physical LAN segments, that are not constrained by their physical location and can communicate as if they were on a common LAN. In order to segment the LAN into VLANs, each node of the LAN must be assigned a VLAN identifier (VLAN ID). Next, each node must be assigned to at least one VLAN. After assigning each node to a particular VLAN, the assignment information is used by the network interface device to generate a VLAN header, including a VLAN tag and the VLAN ID. The VLAN header is inserted into a frame header of the data to be transmitted. The data is transmitted over the LAN which is segmented by network protocols or through a remote access connection protocol to a destination node. A network interface device at the destination node strips the VLAN header and passes a remaining part of the frame to a software driver.

A VLAN header is a unique frame identifier which is added at a source node within each frame header to be transmitted on the phone line LAN. This header information designates the VLAN membership of each frame. The frame is received by the appropriate destination node based on the network protocol, the VLAN header and MAC address. Upon reaching the destination node location, the VLAN header is removed (stripped) from the frame by the device driver and a remaining part of the frame is forwarded to a software driver. The use of a VLAN header to virtually segment a phone line network LAN which has been segmented by other network protocols provides a powerful mechanism for controlling the flow of data and access to applications while remaining non-intrusive to applications, the LAN, the remote access connection, or the VPN.

According to one aspect of the present invention, a method of securing a data frame associated with a virtual network transferred on a network including a plurality of devices coupled by a shared home phone line medium with a remote network. The method includes attaching to the data frame a virtual local area network (VLAN) header whose contents indicate the data frame may be transmitted within a particular VLAN indicated by an identifier field of the VLAN header. The data frame is transmitted within the particular virtual network.

According to another aspect of the present invention, a method of transmitting on a shared home phone line medium including a plurality of devices coupled to the home phone line medium, a plurality of data frames associated with a plurality of virtual networks including a remote network. The method includes attaching to the data frames a VLAN header whose contents indicate said data frame may be transmitted within a particular virtual network indicated by an identifier field of the VLAN header. The data frames associated within a particular virtual network are transmitted to devices associated with the particular virtual network at a remote network.

According to another aspect of the present invention, a method of communicating between a phone line network which includes a plurality of devices coupled by a shared phone line medium, and a remote network. The method includes attaching a virtual local area network (VLAN) header to a data frame, wherein the VLAN header includes contents which indicate that the data frame may be transmitted within a virtual network indicated by an identifier field of the VLAN header. Further, the virtual network includes at least part of the phone line network and at least part of the remote network. The data frame is transmitted to the remote network and within the virtual network. The data frame is transmitted along a network connection between the network and the remote network. The network connection between the phone line network and the remote network may be a virtual private network (VPN) connection.

According to another aspect of the present invention, a method of transmitting on a shared home phone line medium including a plurality of devices coupled to the home phone line medium, a plurality of data frames associated with a plurality of overlapping virtual networks including a remote network. The method includes attaching to the data frames a VLAN header whose contents indicate said data frame may be transmitted within a particular virtual network indicated by an identifier field of the VLAN header. The data frames associated within a particular virtual network are transmitted to devices associated with the particular virtual network at a remote network. The data frames associated with a second virtual network are transferred at a device common to all networks.

According to another aspect of the present invention, a method of securing a data frame associated with a virtual network transferred on a network including a plurality of devices coupled by a shared home phone line medium with a remote network. The method includes communicating within a phone line LAN by assigning a unique VLAN ID to each node of a VLAN. A VLAN header is attached at a source node of the frame to each frame to be communicated within the VLAN. The VLAN header contains identification information associated with the VLAN. The VLAN header is inserted by a network interface device driver into a frame header. Data communication within the VLAN is controlled at the nodes of the VLAN by examining incoming frames for the presence or absence of the VLAN header. The VLAN header is stripped at the destination nodes of the VLAN from the frame header and a remaining part of the frame is passed to a software driver.

According to another aspect of the invention, a method of communicating within a virtual private network (VPN) on a local area network (LAN), which include parts of a phone line VPN, includes registering each node of the LAN to at least one VLAN by assigning a unique VLAN ID to each node. A VLAN header is attached at a source node of the frame to each frame to be communicated within a VLAN of the VPN. The VLAN header contains identification information associated with the VLAN. The VLAN header is inserted by a network interface device driver into a frame header. Data communication within the VLAN of the VPN is controlled at the nodes of the specific VLAN by examining incoming frames for the presence or absence of the VLAN header associated with the specific VLAN. At destination nodes of the specific VLAN of the VPN, the VLAN header is stripped from the frame header and a remaining part of the frame is passed to a software driver. Thus, the VLAN headers ensure that the frame to be communicated within the specific VLAN of the VPN remains within the nodes of the specific VLAN of the VPN, exclusively.

According to yet another aspect of the present invention, a method of communicating within a virtual private network (VPN) on a local area network (LAN), which includes a phone line LAN having nodes of a mixed network, includes the assignment of a unique VLAN ID to each node of a VLAN of the VPN. A VLAN header is attached to each frame to be communicated within the VLAN of the VPN at a source node of the frame. The VLAN header contains identification information associated with the VLAN. The VLAN header is inserted by a network interface device into a frame header. Data communication within the VLAN of the VPN is controlled at the nodes of the VLAN by examining incoming frames for the presence or absence of the VLAN header. At destination nodes of the frame, the VLAN header is stripped from the frame header and the remaining part of the frame is passed to a software driver.

According to yet another aspect of the present invention, a VLAN may be further defined at the network layer with segmentation commonly based on protocol type and network address. This type of VLAN segmentation requires subnet address mapping to VLAN groups. The transmitting device associates the (source) node MAC address to a VLAN based on the subnet address. Additionally, the transmitting device determines the other network nodes that belong to the same VLAN.

In another embodiment, a 32-bit (4 byte) VLAN ID field is applied to every frame as it is forwarded across links; each frame carries a unique identification and is forwarded to the device that has been configured with the same VLAN an identification. Only frames that are destined for remote addresses outside the local VLAN need to proceed to a hub, switch, router, bridging server of a remote connection or VPN connection or the like for forwarding. At the destination device the 32-bit address is removed. VLANs are carried transparently across these networks, and require no configuration or intervention by network managers.

The present invention has the ability to concurrently handle layer 2 and layer 3 VLANs, as well as the ability to interconnect VLANs both within the LAN, across LANs and through remote access connections. Layer 2 is at the data link level and is defined by port or MAC address. Layer 3 is at the network level and is defined by an Internet Protocol (IP) address or the like.

The network interface device driver has a way of understanding VLAN membership (that is, which nodes belong to which VLAN and which VPN) when network traffic arrives from other nodes. In general, layer 2 based VLANs (defined by port or MAC address) must communicate VLAN membership explicitly, while VLAN membership in Internet Protocol (IP) and VPN based VLANs is implicitly communicated by the IP address and VPN protocols.

To the accomplishment to the foregoing and related ends, the invention comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed. Other objects, advantages and novel features of the invention will become apparent in the following detailed description of the invention when considered in conjunction with the drawings.

DETAILED DESCRIPTION

The present invention relates to a method for controlling the data transferred on a phone line local area network (LAN) segmented by various network protocols by inserting a virtual LAN (VLAN) header containing VLAN identification (VLAN ID) information into a frame header. The VLAN header VLAN ID information provides the means for identifying to which virtual subnet (VLAN) of the segmented phone line LAN the data may be transferred to. The frame header of a data packet containing the VLAN header and VLAN ID information associate a specific VLAN with such VLAN ID information. A destination node checks the VLAN ID information and only forwards the data packet to an end-system also associated with the specific VLAN. This assures that the data packet remains within the VLAN.

Figure 1:
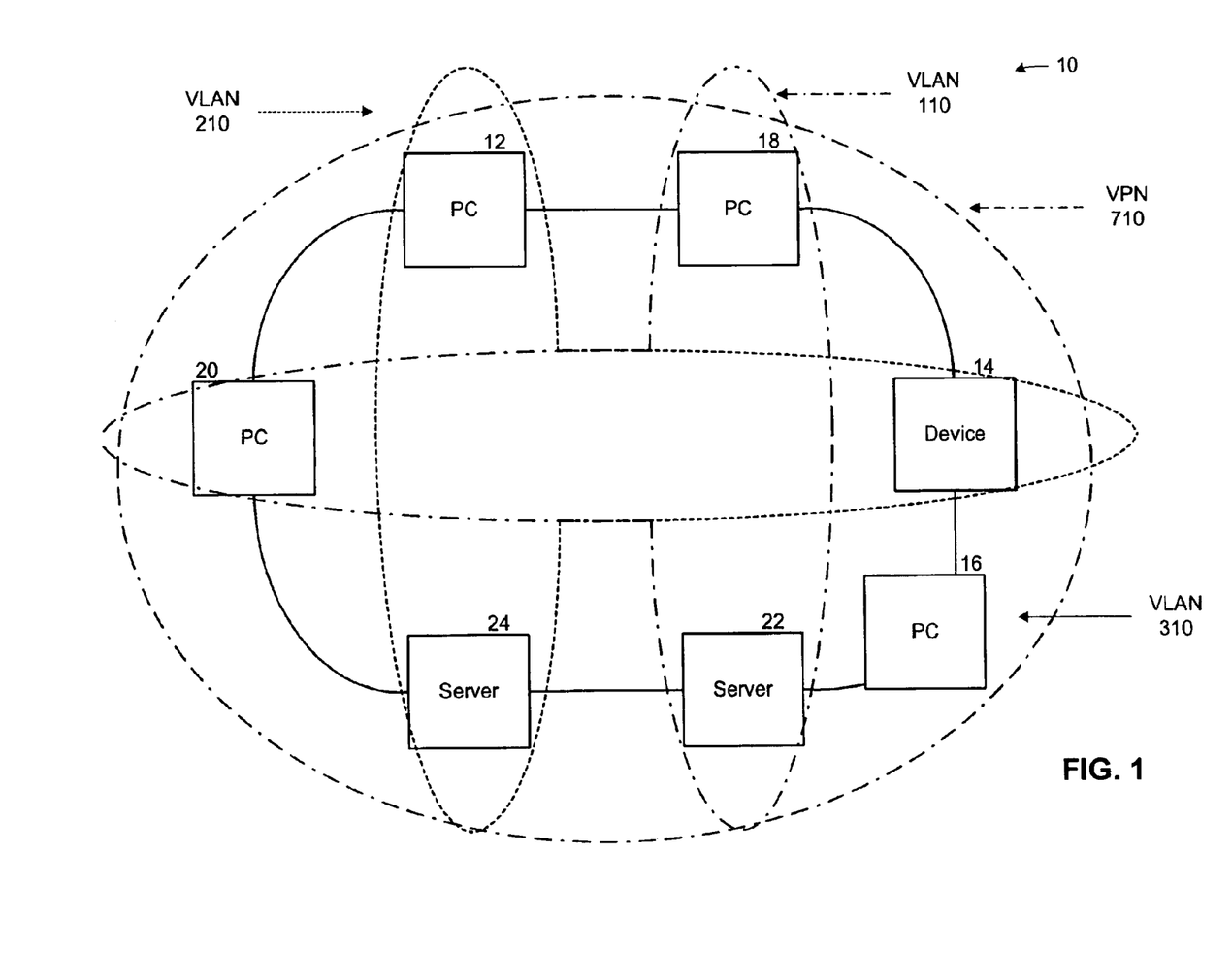
FIG. 1 illustrates a VLAN-enabled phone line LAN topology in accordance with the present invention.

Turning now to FIG. 1, there is shown a phone line LAN 10 topology of the present invention which uses VLAN tags to set up distinct VLANs. VLANs 110, 210 and 310 are separate and distinct VLANs on the same physical phone line LAN 10. Virtual private network 710 is shown to include the entire network. However, VPN 710 could include fewer devices of the phone line LAN 10. PC 12, device 14, and PC 16 are a set of end-systems associated with one function. PC 18 and device 20 are a set of end-systems associated with another function. There are also two servers on the LAN, server 22 and server 24.

VLAN 210 is comprised of PC 12, device 14 and server 24. VLAN 110 is comprised of PC 18, device 20 and server 22. VLAN 310 is an isolated VLAN comprised of PC 16.

PC 12, PC 18, device 14, PC 16, servers 22 and 24 and device 20 are connected in series via phone lines to complete a physical phone line LAN with device 20 and PC 12 connected as well.

An infrastructural approach to VLANs is based on the functional groups (that is, the departments, workgroups, sections, etc.) that make up the organization. Each functional group, such as accounting, sales, and engineering, is assigned to its own uniquely defined VLAN. For additional security each of these functional groups could also be assigned to a mirror VPN or the like. The VLANs and VPNs or the like may be divided up by organizational groupings, services, applications, or in other ways. Organizations that implement VLANs and VPNs or the like recognize the need for a certain logical end-systems (for example, centralized service) to communicate with multiple VLANs and VPNs on a regular basis, either through overlapping VLANs and VPNs (in which network attached end-systems simultaneously belong to more than one VLAN or VPN) or via integrated routing that can process inter-VLAN frames at wire speed. In this model, VLAN/VPN overlap occurs at network resources that must be shared by multiple workgroups. These resources are normally servers, but could also include printers, routers providing WAN access, one or more nodes functioning as gateways, and so forth.

Figure 2:
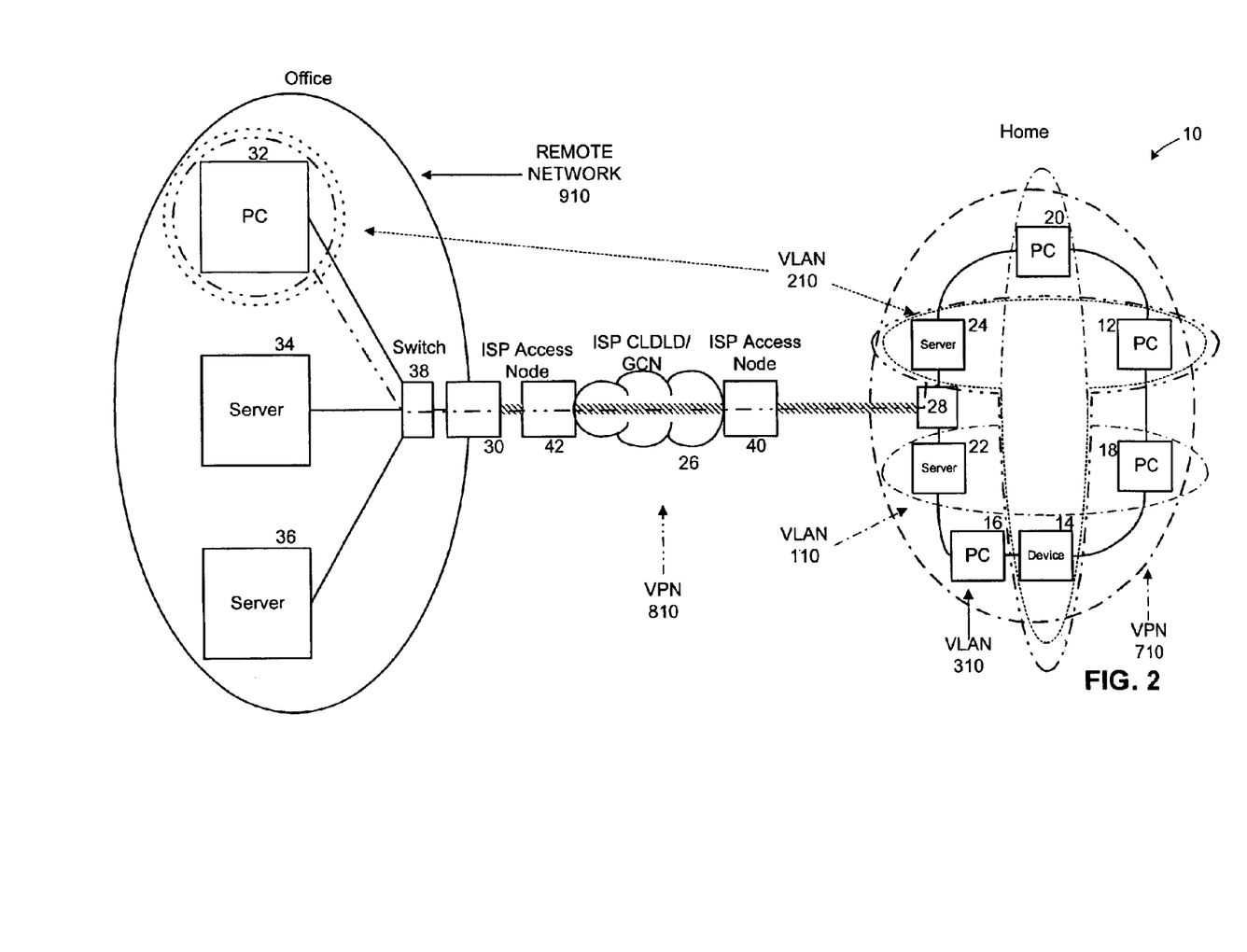
FIG. 2 illustrates a VLAN-enabled phone line LAN topology with remote access in accordance with the present invention.

Turning now to FIG. 2, virtual private network 810 is shown to connect the phone line LAN 10 to a remote network 910 through the global computer network 26. VPN 810 includes VPN gateway devices 28 and 30 at the phone line LAN 10 interface and at the remote network 910 interface, respectively. In addition to the end-systems associated with the VLAN 210 of FIG. 1 there is PC 32 located on remote network 910. There are also two servers on remote network 910, server 34 and server 36. A switch 38 is connected to PC 32, server 34 and server 36. It is understood that switch 38 and devices, PC 32, server 34 and server 36 are representative devices and could be any devices which can be connected to a network and can be connected to each other in various network configurations.

VPN 810 is comprised of VPN gateway 28 the VPN interface connected to the phone line LAN 10, ISP Access node 40 which could be any connection means which would allow a user to connect to the global computer network 26. There is also a VPN gateway 30 which is the VPN interface connected to the remote network 910, ISP Access node 42 which could also be any connection means which would allow a user to connect to the global computer network 26. The VPN gateway 30 is connected to switch 38 of the remote network 910. It is understood that VPN gateway 30 may not be necessary if switch 38 or a like device is VPN capable. VPN 810 connects is shown connecting a home phone line LAN 10 to an remote network 910. It should be understood that a mobile computer could be connected as well through a dial up connection directly to an ISP access node or the like.

Figure 3:
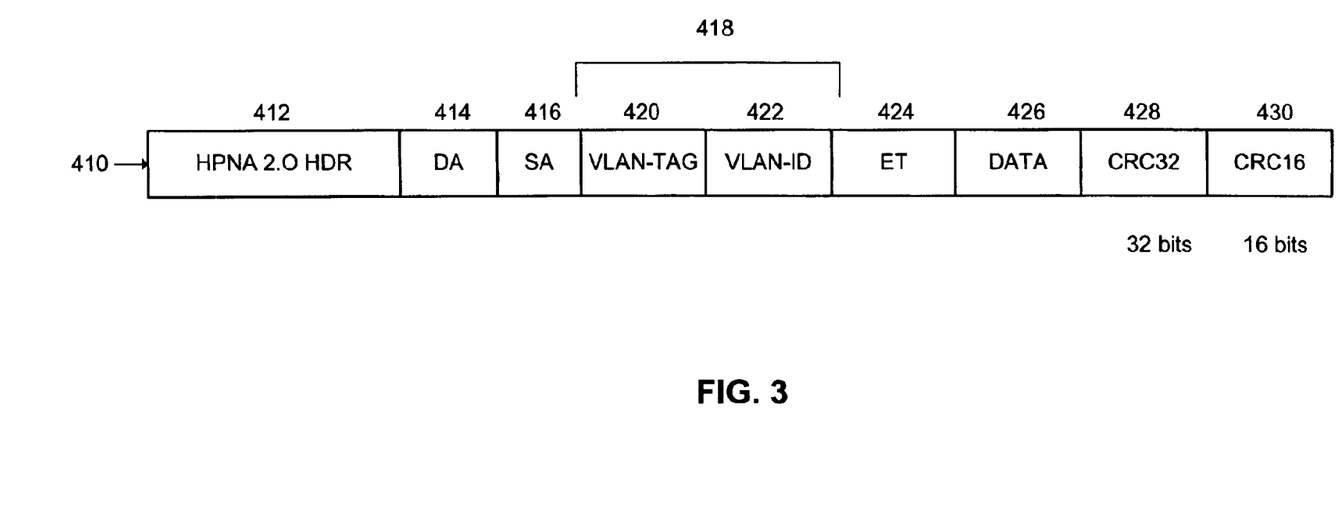
FIG. 3 illustrates a VLAN frame format in accordance with the present invention.

FIG. 3 illustrates an exemplary data frame format that may be utilized by the present invention. The frame 410 begins with a HPNA 2.0 header 412. Following the HPNA 2.0 header 412 is a destination address field 414, followed by a source address field 416. Following the source address field 416 is a VLAN header field 418. The VLAN header field is comprised of VLAN TAG field 420 followed by a VLAN ID field 422. Following the VLAN header field 418 is a Ether-type field 424. A variable length data field 426 follows the Ether-type field. Following the data field is a frame check sequence field 428, comprising a 32-bit cyclic redundancy check (CRC) of the contents of fields 412, 414, 416, 418, and 426. Finally, there is a 16-bit CRC 16 field 430 comprising a 16-bit CRC of the contents of fields 412, 414, 416, 418, 426 and 428.

Generally, the MAC address of each node, as determined by the contents of the source address field 416 (MAC address) of a data frame transmitted by the node is associated with a VLAN assigned to the port of a network device. The method by which the network interface device forwards the data frame varies depending on whether the target node (as determined by the MAC address in the destination MAC address field of the data frame) resides on the same or a different VLAN as the source node.

The method described herein provides for a shared communications medium (phone line) for transferring data frames from one or more VLANs while preserving the VLAN associated with each frame.

It will be appreciated that the above-described data frame format is only exemplary, and that many suitable variations are possible. For example, although the above-described embodiment of the present invention utilizes only one type and length of VLAN ID field, it is foreseeable that multiple types of VLAN identifiers may be utilized, and that such identifiers may be of varying lengths, depending on the information conveyed by such identifiers, in which case, a network node receiving the data frame should check for a VLAN ID type inserted within the VLAN header field and determine whether to accept or reject the data frame. In the event multiple VLAN ID types are utilized, it is envisioned that the VLAN ID type values will be dispensed by an administrative authority.

At the time, or prior to transmitting the data frame over a shared communications medium to another network node, the network interface device inserts the VLAN header between the source address field and the Ether-type data field of the data frame. If utilized, a VLAN identifier type and VLAN identifier length field (not shown) is inserted in the VLAN header between VLAN TAG field 420 and VLAN ID 422. Finally, the VLAN identifier associated with the data frame is placed in the VLAN identifier field 422. The data frame now having a VLAN frame format is then transmitted over the shared communications medium.

Upon receiving the data frame, a network interface device processes the data frame. It determines the MAC address of a target node based on the contents of the destination address 414 (MAC address). The device then detects the presence of a VLAN TAG following the source address 416 (MAC address) and determines the VLAN identifier associated with the data frame based on the contents of the VLAN identifier field. If the network device is eligible to receive the frame based on the destination MAC address being assigned the same VLAN identifier as the data frame, the network interface device then removes the VLAN header from the data frame, calculates a new CRC 16 for the data frame, and transmits the data frame over a dedicated communication medium to the software driver.

Figure 4:
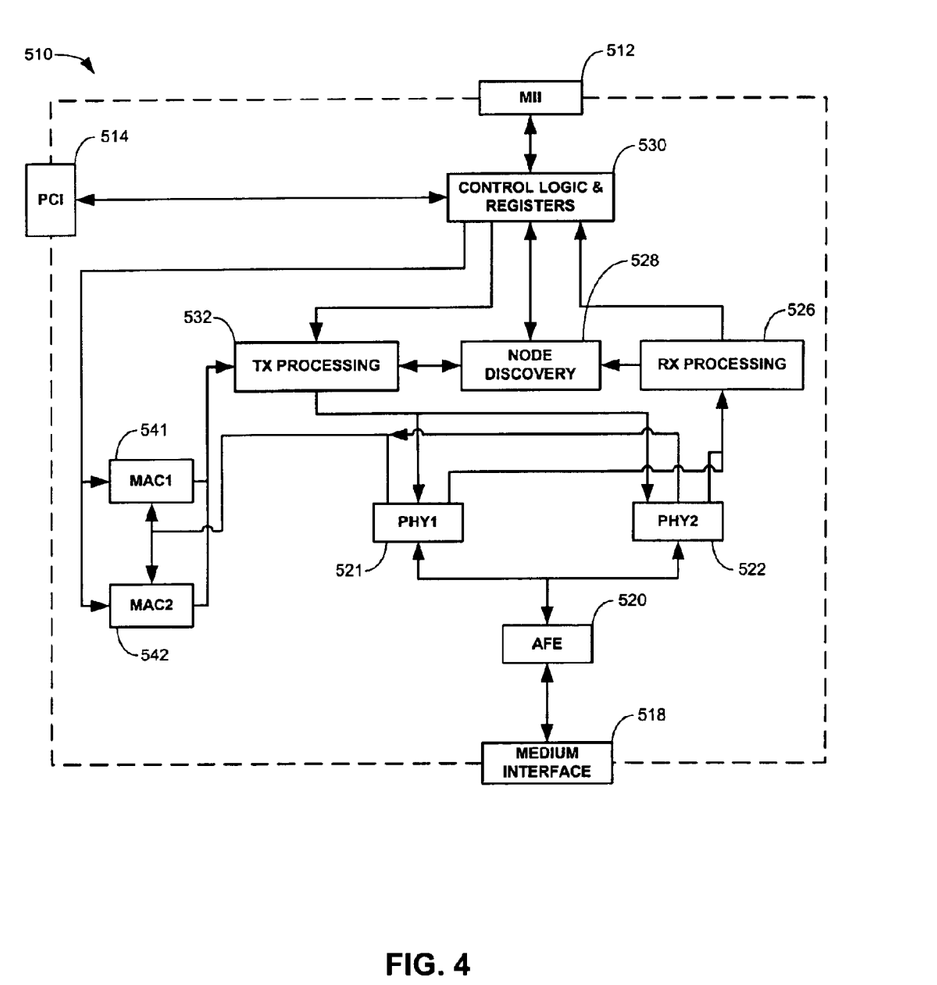
FIG. 4 is a block diagram of a network medium interface device which is suitable for use in the LAN topology of FIG. 1.

FIG. 4 shows a conceptual diagram of a multi-PHY, multi-MAC network medium interface device 510 used for coupling higher-level blocks of a network node, such as in a computer or other networked device, to a network medium. The network interface device 510 shown in FIG. 4 and described below is suitable for use in the phone line LAN 10 described above. The interface device 510 includes a pair of higher-level interfaces for interfacing with the higher-level blocks, such as a medium independent interface (MII) 512 and a peripheral component interconnect (PCI) 514. The interface device 510 also has an interface, such as medium interface 518, for coupling to the network medium. An analog front end 520 is coupled to the medium interface 518. The analog front end 520 is also coupled to a pair of physical layer devices (PHYs), a first PHY 521 and a second PHY 522. The PHYs 521 and 522 handle transmission to and receipt of data from the network medium.

Data received by the PHYs 521 and 522 from the network medium is passed along to a receive processing block 526. The receive processing block 526 may include well-known devices such as state machines and FIFOs, and may perform functions such as assembling and/or reformatting frames or packets of data received, performing error checks on the frames, compiling and appending data to the frames or packets, and stripping unnecessary bits from the received frames or packets. As explained in greater detail below, the receive processing block 526 may send data and/or information to a node discovery block 528, which may obtain, retain, and communicate node capability information and/or network topology information. The node discovery block 528 may include an electronically-readable storage device, such as a cache, for storing information regarding various nodes of the network, for example information regarding the capabilities of the nodes and nodes associated with various VLANs.

From the receive processing block 526, the incoming data is passed to a control logic and registers block 530, which may store and/or further process the incoming data. The control block 530 may include such devices as data registers, SRAMs, state machines, FIFOs, and/or various logic devices. The control block passes the received data to higher-level devices via the MII 512 and/or the PCI 514.

A transmit processing block 532 is coupled to the control block 530 for handling data to be transmitted on the network medium. The transmit processing block 532 may include devices such as state machines, FIFOs, and routing blocks. The data to be transmitted may be data generated from the higher-level device block 512. Alternatively, the transmitted data may be generated by the interface device 510 itself, such as by the control block 530. For instance, the interface device 510 may generate frames or packets, or may otherwise send data, regarding its capabilities, indicating its presence on the network, confirming successful receipt of data sent by another node, and/or requesting retransmission of frames or packets previously sent by another node on the network.

The transmit processing block 532 is operatively coupled to the PHYs 521 and 522 to pass data for transmission on the network medium. From the PHYs 521 and 522 the data to be transmitted passes through the analog front end 520 and the medium interface 518, to be transmitted along the network medium.

The PHYs 521 and 522 may be configured to send (transmit) frames or packets utilizing different specifications, for example, using different formats, protocols, or at different rates. In a particular exemplary embodiment, the interface device 510 is configured to interface with a network medium which includes wiring for phone lines. The PHYs 521 and 522 in the particular embodiment are configured for communicating in accordance with different home phoneline networking alliance (HPNA) specifications. For example, the first PHY 521 may be configured to communicate in accordance with the HPNA 1.0 specification, and the second PHY 522 may be configured to communicate in accordance with the HPNA 2.0 specification. The HPNA 1.0 and 2.0 specifications are hereby incorporated by reference in their entireties.

The PHYs 521 and 522 may have different operating characteristics from each other. For example, the PHYs 521 and 522 may be configured to operate at different frequencies. The first PHY 521 may be a variable-frequency PHY 521 which is operatively configured to operate within a range of frequencies. The second PHY 522 may be a fixed-frequency PHY, configured to operate at a fixed frequency, which for instance, may be outside the range of frequencies at which the first PHY 521 operates. It will be appreciated that the PHYs 521 and 522 alternatively may be otherwise configured with respect to their frequencies of operation. For example, the PHYs 521 and 522 may both be fixed-frequency PHYs, but operating at different frequencies. As another example, the PHYs 521 and 522 may both be variable-frequency PHYs, but with different ranges of frequency, the ranges either being non-overlapping or partially overlapping. Further, it will be appreciated that the PHYs 521 and 522 may alternatively or in addition have different operating characteristics not directly related to frequency. The interface between the PHYs 521 and 522 and the processing blocks 526 and 532 may include means for synchronizing the data transfer to take into account the different operating characteristics of the PHYs.

As explained further below, the transmit processing block 532 is operatively coupled to the node discovery block 528. The transmit processing block 532 may send queries to the node discovery block 528 regarding the capabilities of the destination node to which a frame or packet to be transmitted. The node discovery block 528 may respond with an indication of which of the PHYs 521 and 522 is to be used in transmitting a frame to the indicated destination node.

First and second MACs 541 and 542 are used to monitor the network medium for activity, such as transmissions by other nodes on the network, and to control the timing of transmission by the interface device 510, in order to minimize collisions on the network medium. The PHYs 521 and 522 may be coupled to the MACs 541 and 542 to provide the MACs with information regarding activity on the network medium. For example, one or both of the PHYs 521 and 522 may send or otherwise assert a signal, such as a carrier receive signal (CRS), when data is being received by the PHYs from the network medium. In addition, the PHYs 521 and 522 may send respective collision signals to the MACs 541 and 542 when a collision is detected during transmission of a frame.

The MACs 541 and 542 are operatively coupled to the transmit processing block 532 to control the transmit processing block. The MACs 541 and 542 may control timing of transmissions by the interface device 510 along the network medium by controlling when the transmit processing block 532 forwards data to the PHYs 521 and 522. The timing of transmissions may be selected, for example, based on availability of the network medium (thus avoiding collisions on the medium) and on the priority of the frame to be transmitted.

Depending on the topology of the network (the capabilities of the various nodes), either the first MAC 541 or the second MAC 542 is used to monitor the network medium and control transmission of frames thereupon. For example, if all of the nodes of the network are able to operate with enhanced capabilities (e.g., sending frames with various priority levels), one of the MACs may be active (used to monitor the network medium and control transmission of frames). The active MAC in such a case is the MAC which is able to handle the enhanced capabilities. The other MAC (not configured to take advantage of the enhanced capabilities) may be the active MAC when the network includes nodes that do not operate with the enhanced capabilities (a "mixed network" topology).

The information gathered and stored by the node discovery block 528 may be used in selecting which of the MACs 541 and 542 is the active MAC. As described in greater detail below, the node discovery block 528 may provide an indication that the network has a mixed network topology. The detection of a mixed network topology may result in the node discovery block 528 sending a signal to the control block 530 to write a bit to a data register, indicating a mixed network topology. The presence or absence of a bit in the register of the control block 530 may be used by the control block to send an enable or disable signal to one of the MACs 541 and 542. It will be appreciated that other means may be used to enable or disable one of the MACs 541 and 542 based on a network topology detected by the node discovery block 528.

Figure 5:
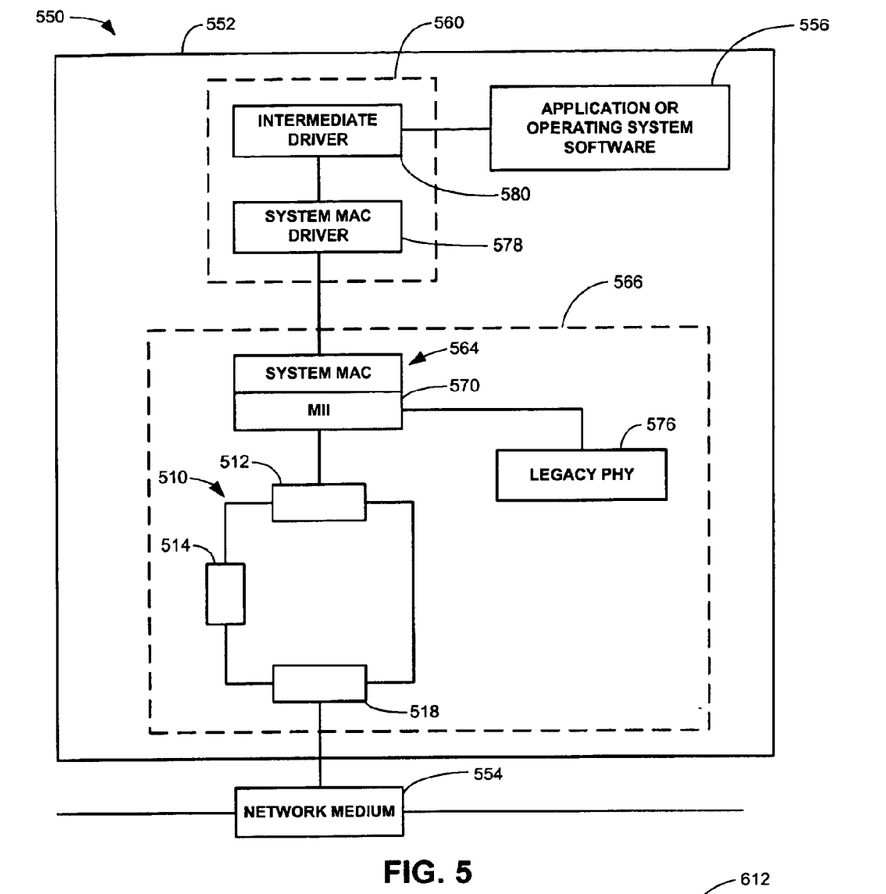
FIGS. 5 and 6 are block diagrams of the interface device of FIG. 4 as part of network node configurations.
Figure 6:
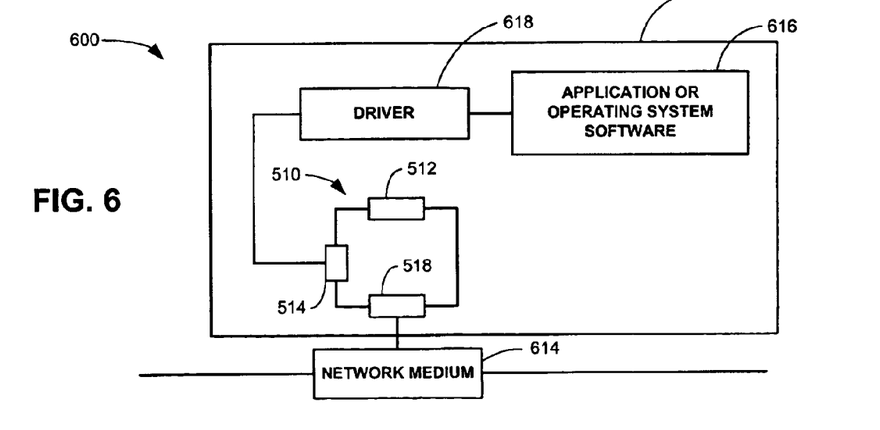

Turning now to FIGS. 5 and 6, two configurations as shown for attaching the interface device 510 to higher-level blocks and a network medium. In FIG. 5, a network node 550 includes the interface device 510 as a means for connecting a host, such as a host computer 552, to a network medium 554. In the host computer 552, data from operating system or application software 556 is received and processed by a software device driver arrangement 560.

The operating system or application software 556 creates data and notifies a network interface, for example using TCP/IP, that data is waiting to be sent to a specific node of the network. The network interface apparatus translates the destination node information into a destination address, reformats the data as necessary, and sends the data to the device driver arrangement 560 via a defined interface, for example via an interface following the NDIS (Network Driver Interface Specification) or ODI (Open Data-link Interface) specifications. The device driver arrangement 560 may reconfigure the data into a format compatible with devices downstream toward the network medium 554, and may create and add header information such as VLAN ID information which includes an IP address source and destination addresses, and data transmission speed. The device driver arrangement 560 may also divide data from the software 556 into frames or packets of suitable length.

The frames or packets pass from the device driver arrangement 560 to a system MAC 564. The system MAC 564 may be part of a network interface card 566 which is installed in the host computer 552. The MAC 564 may prepend or append additional information to packets received from the device driver arrangement 560. For example, the MAC may calculate and append some form of frame check sequence (FCS), such as a cyclic redundancy check (CRC), to the frames or packets.

The system MAC 564 includes a system MAC media independent interface (MII) 570 operably coupled to the corresponding MII 512 on the interface device 510. The MIIs 512 and 570 are capable of passing data and other information between the system MAC 564 and the interface device 510. The system MAC 564 may also be coupled, via the system MAC MII 570, to a legacy or system physical layer device (PHY) 576, the legacy PHY being configured for interfacing a network medium of a type different than the network medium 554.

The terms "media independent interface" and "MII" as used herein, are intended to include external interface connections which are variations on the standard MII, such as the reduced media independent interface (RMII) and the serial media independent interface (SMII).

The software device driver arrangement 560 and the interface device 510 have the capability of exchanging control or other information by the use of special packets or frames. These special packets or frames are configured to pass through the system MAC 564, without a loss of the control information or other data. Toward this end the software device driver arrangement 560 includes a system MAC device driver 578 and an intermediate driver 580. The system MAC device driver 578 s a device-specific driver designed for interfacing with the application or operating system software 556 and the system MAC 564 to allow communication between the operating system and the system MAC. The system MAC device driver 578 thus functions as part of the system to produce suitably-formatted data received from a network through the legacy PHY 576 and passed through the system MAC 564.

The intermediate driver 580 is a device-specific driver as regards the interface device 510. However, the intermediate driver 580 may be device-independent regarding the system MAC 564. That is, the intermediate driver 580 may be compatible with a variety of system MACs and system MAC device drivers. It performs the function of interfacing with the interface device 510, and properly formatting and passing along data to be sent and received by the network medium interface device. The intermediate driver 580 may appear "transparent" to the application or operating system software 556 and the system MAC device driver 578. That is, the application or operating system software 556 may operate as if it is interfacing directly with the system MAC device driver 578, and the MAC device driver may operate as if it is interfacing with the application or operating system software.

Control information may be passed between the control block 530 (FIG. 4) of the interface device 510, and the intermediate driver 580, via special frames or packets which are of a form that they pass unobtrusively through the intervening parts of the network node 550, such as the system MAC device driver 578, and the system MAC 564. The special frames or packets may have the format corresponding to that of a data frame or packet which would be transmitted or received by the network node 550. Thus the special frames or packets may have fields which correspond to the fields in a data frame or packet, for example information in fields corresponding to a destination address, a source address, a length and/or type of the frame, etc. The control information in the special frames or packets may be in the same position as data or payload is within a normal frame or packet. The control information in a special frame or packet sent from the intermediate driver 580 to the network medium interface device 510 may contain a series of register addresses and register contents, the control information being used to alter registers of a component of the interface device 510. For example, the control information in the special frame may have the same form as that of control information from an EEPROM, and may be routed to an EEPROM or a device that is coupled to an EEPROM.

The special frames or packets include identifiers which allow the part of the network node 550 which is the desired destination of the special frame, either the intermediate driver 580 or the control block 530 (FIG. 4), to detect the special frames from among the normal data frames passing through the interface device 510. The identifier may be a unique address in the source and/or destination address fields of the special frame. The identifier for the special frames may use an otherwise unused IEEE address as a source or destination address. Alternatively, the special frames may utilize the IEEE address of the network interface card 566 or the interface device 510 as a destination address for special frames sent by the intermediate driver 580, and/or as a source address for special frames sent by the interface device 510. Another alternative identifier involves the special frame having a source address and a destination address which are the same. It will be appreciated that the control block 530 (FIG. 4) and the intermediate driver 580 may be configured to detect the foregoing identifiers.

The control information in the special packets may include various kinds of information for internal use within the network node 550. For example, the control information may include information regarding what transmit rates are to be used in transmitting data; information regarding the existence, identification, or capabilities of other network nodes; information regarding control of output drive characteristics (edge rate control on the network); and/or information regarding the internal operation of the network interface, including control information indicating the receipt of other special frames. The control information may be stored at its destination, for example in memory registers of the interface device 510 or the host computer 552.

It will be appreciated that the intermediate driver 580 include some or all of the functions of gathering, storing, and communicating information on network topology, which were described above with regard to the node discovery block 528. Thus the intermediate driver may gather node capability information from frames received by the interface device 510 and passed to the intermediate driver 580. Also, node capability information may be gathered from capabilities and status announcement (CSA) frames which may be sent by other nodes to provide information about that node and/or about the network topology. CSA frames may be broadcast frames, may be sent at specified intervals, and may include information about the capabilities of the sending node (e.g., the rate at which the node is capable of transmitting and receiving, and/or the capability or lack thereof for specified enhanced operation features), the mode of operation of the sending node, and the network topology perceived by the sending node.

The intermediate driver 580 may be coupled to a suitable memory device, for example a RAM, for storing the information about the network topology. The memory device may be a part of the host computer 552.

The intermediate driver 580 may be configured to append network topology information to frames to be transmitted. For example, the intermediate driver 580 may append or otherwise add information to a transmit frame regarding whether the first PHY 521 or the second PHY 522 is to be used to transmit the frame, the data rate at which the frame is to be transmitted, and/or regarding whether the first MAC 541 or the second MAC 542 is to be used to monitor the network medium and control transmissions.

The intermediate driver 580 may also send to the control block 530 (FIG. 4) control information regarding operation of the node discovery block 528, and/or control information regarding selection of one of the MACs 541 and 542 as the active MAC. Thus the intermediate driver 580 may send signals to the control block 530 (FIG. 4) to write a bit to a memory indicating a mixed network topology, for example. The intermediate driver 580 may also or alternatively send a signal to the control block 530 (FIG. 4) to disable some or all of the functions of the node discovery block 528, for example to allow the disabled functions to be performed solely by software. Such control information may be sent from the intermediate driver to the control block 530 (FIG. 4) via special frames.

Alternatively, it will be appreciated that the control block 530 (FIG. 4) may be configured to detect the presence of the intermediate driver 580, and to disable some or all of the functions of the node discovery block 528 upon detection of the intermediate driver 580. The method of detecting the intermediate driver 580 may include sending special frames between the control block 530 (FIG. 4) and the intermediate driver.

It will be appreciated that the configuration of the network node 550 shown in FIG. 5 and described above is merely exemplary, and that the network interface may have a different configuration if desired. For example, the intermediate driver 580 may alternatively be placed between the system MAC device driver 578 and the system MAC 564. Alternatively, the device drivers 578 and 580 may be replaced by a single driver, if desired.

It will be appreciated that the network medium 554 may be wiring for telephone lines, or alternatively (with suitable modifications to the interface device 510) be any of a variety of well known media, such as fiber-optic cables or various types of dedicated metal-wire cables, for instance, such as twisted, shielded pair, or 10 BASE-T. Alternatively, the network medium may include wireless communication.

Turning now to FIG. 6, a network node 600 is shown which also includes the interface device 510 described above. The network node 600, which may be part of a host computer 61 2, includes application and/or operating system software 616, and a software driver 618 coupled to the application software. The software driver 618 is coupled to the PCI 514 of the interface device 510, for example via a bus of the host computer 612. The network medium interface device 510 is operatively coupled to a network medium 614, which may be of the same type as the network medium 554 described above.

It will be appreciated that the software driver 618 may also be configured to perform some or all of the functions of the node discovery block 528, if desired. In such a case, the software driver 618 may send control signals or information to the control block 530 (FIG. 4), for example to partially or completely disable the node discovery block 528 (FIG. 4).

It will be appreciated that the devices shown in FIGS. 3–5 are only exemplary of suitable devices that may be used as part of the phone line VLAN described herein.

One advantage of a network interface device inserting a VLAN header into a frame header, as described earlier, is the ability to segment the phone line LAN into virtual subnets (VLANs) with in a VPN. Another advantage of the present invention is the additional security provided to the data transmitted and stored on the VLAN by isolating nodes from other nodes through the use of VLAN headers and VPN protocols. Yet another advantage of a VLAN/VPN enabled network is the ability to provide reasonable privacy at the physical layer through the VLAN header with enhanced security provided by the use of encryption at the VPN level. Another advantage is the ability of VLANs to create firewalls which enhances security requirements through the use of multiple firewalls at different levels. The only broadcast traffic on a single-user segment would be from the user's VLAN (that is, traffic intended for that user). Conversely, it would be impossible to listen to broadcast or unicast traffic not intended for that user (even by putting the node's network adapter in promiscuous mode), because such traffic does not physically traverse that segment.

Yet another advantage of a VLAN/VPN enabled phone line LAN is the reduced cost of installation of the network due to the use of existing phone lines. Additionally, the VLAN nodes are easy to install due to the ability to plug into the phone line LAN through the use of a phone line jack. Another advantage of this system is the ability to securely communicate data at rates equal to or better than 10 Base-T Ethernet. Yet another potential advantage is compatibility with prior protocols which provides the ability to set up a mixed network. Also, there is the potential advantage of compatibility with various vendors' devices using various protocols. Another advantage of the VLAN enabled phone line LAN is the scalability of the VLAN-enabled network. In other words, network managers may be able to increase the number of nodes on the network and may be able to easily assign these nodes to particular VLANs.

Additionally, by segmenting the phone line LAN into multiple VLANs and VPNs, the traffic across the phone line LAN may be reduced by controlling traffic within the physical segments which make up the individual VLANs. Another advantage of VLANs is that VLANs are an extremely effective mechanism for network managers who require a great deal of bandwidth between multiple devices. Grouping users and traffic into distinct VLANs and VPNs allows network managers to add redundant links between devices and to use these links to distribute traffic. Additionally, VLAN enabled VPNs remove the physical boundaries of grouping users by floor, address space, etc.

Another advantage of VLAN/VPNs in a phone line LAN is the capability to establish virtual workgroups. The concept is that, with full VLAN implementation across a network environment, members of the same department or section can all appear to share the same LAN, with most of the network traffic staying within the same VLAN broadcast domain. Someone moving to a new physical location but remaining in the same department could move without having the node reconfigured. Conversely, a user would not have to change his or her physical location when changing departments; the network manager could simply change the user's VLAN/VPN membership. Another example is when a temporary team is formed for a project, the team could be virtually connected to the same LAN without requiring the people to physically move in order to minimize traffic across the network. Further, these workgroups would be dynamic: VLAN/VPNs corresponding to these cross-functional project teams could be established for the duration of the project and deactivated when the project was completed, all the while allowing all users to remain in the same physical locations.

An advantage of defining the VLAN/VPN at the network layer based on protocol type and network address is that a network manager may be able to segment the network based on network-layer information within each frame.

An advantage of using a 32-bit VLAN ID field in the IEEE 802.1q protocol is that it would allow interoperability because of the VLAN standard, thus allowing inter-VLAN and cross-vendor communications.

An advantage of VLAN/VPNs based on MAC addresses is to enable network managers to move a node to a different physical location on the phone line LAN and have the node automatically retain its VLANNPN membership, since MAC-layer addresses are hard-wired into the nodes network interface device. In this way, a VLAN/VPN defined by MAC address can be thought of as a user-based VLAN/VPN.

One of the drawbacks of MAC address-based VLAN solution is the requirement that all users must initially be configured to be in at least one VLAN. VLANs based on layer 3 information take into account protocol type (if multiple protocols are supported) or network-layer address (e.g., a subnet address for TCP/IP networks) in determining VLAN membership. Although these VLANs are based on layer 3 information, this does not constitute a "routing" function and should not be confused with network-layer routing.

There are several advantages to defining VLANs at layer 3. First, it enables partitioning by protocol type. This may be an attractive option for network managers who are dedicated to a service—or application- based VLAN strategy. Second, users can physically move their nodes without having to reconfigure each node's network address, which is a benefit primarily for TCP-users. Third, defining VLANs at layer 3 can eliminate the need for frame tagging in order to communicate VLAN membership thereby reducing transport overhead.

The standardized format for VLAN frame tagging, IEEE 802.1q, represents another advantage of VLANs which is VLANs eliminate the hassle of reconfiguring a network when a node is moved, because VLAN membership is not tied to a node's location in the network, thus allowing moved nodes to retain their original IP addresses and subnet membership.

One advantage of a VLAN/VPN connection is high speed customer-scalable bandwidth over dial-up connections. The high speed useful bandwidth may eliminate the need for leased lines connections and the complexity and cost of the associated infrastructure. The user may also have fast dial-up today and the speed of broadband as these services become mature.

Using a firewall with VLAN tagging offers the advantage of transparent access to internally hosted email and Web servers.

The VLAN/VPN security features may provide additional security for mobile workers using remote access with IPsec through the global computer network.

A VLAN/VPN host device is interoperable with other vendors VPN host devices, allowing an office using dial-up connections to access others that may be using broadband. For example, a VPN may span a central site with a high-speed leased line global computer network connection, large branch offices with DSL connections and smaller satellite offices will have two or three bonded dialup connections.

A VLAN/VPN host device may enable Application Service Providers to deliver hosted applications to SOHOs over scalable and affordable global computer network connections. Still another VLAN/VPN host devices may be able to deliver scalable, cost-effective, site to site IPSec VPN connections at upwards of 10 Mbits/sec by bonding multiple DSL or T1/E1 leased line connections without ISP intervention. This will allow users requiring large bandwidth total control over their site-to-site bandwidth by adding extra asynchronous digital subscriber line (ADSL) connections or leased lines without any special provisioning by the ISP.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of communicating between a phone line network which includes a plurality of devices coupled by a shared phone line medium, and a remote network, the method comprising:

a) attaching, at a source node of a frame, a virtual local area network (VLAN) header to a data frame, wherein the VLAN header includes contents which indicate that the data frame may be transmitted within a VLAN indicated by an identifier field of the VLAN header, wherein the VLAN includes at least part of the phone line network and at least part of the remote network; and b) transmitting the data frame to the remote network and within the VLAN, wherein the transmitting includes transmitting the data frame along a network connection between the phone line network and the remote network, wherein the attaching the VLAN header is accomplished by a network medium interface device including a first physical layer device and a second physical layer device, wherein the first physical layer device is configured to communicate in accordance with a first Home Phoneline Networking Alliance (HPNA) specification, and wherein the second physical layer device is configured to communicate in accordance with a second HPNA specification.

2. The method of claim 1, wherein the network connection includes a dial up connection.

3. The method of claim 1, wherein the network connection between the phone line network and the remote network includes a virtual private network (VPN) connection.

4. The method of claim 1, wherein the VLAN header is used to control access to data on the phone line network.

5. The method of claim 1, wherein the identifier field is a 4-byte VLAN ID field.

6. The method of claim 1, wherein the phone line network is segmented into a plurality of virtual LANs (VLANs).

7. The method of claim 6, wherein the plurality of VLANs including the remote network overlap at a device common to all networks, the method additionally comprising:

transferring the data frames between the plurality of VLANs at the device common to all networks.

8. A method of transmitting a data frame associated with a virtual local area network (VLAN), the method comprising:

a) attaching, at a source node of a frame, a VLAN header containing VLAN identification information to each frame to be communicated within the VLAN, wherein the VLAN header is inserted by a device driver into a frame header;

b) controlling communication at nodes of the VLAN by examining incoming frames for the presence or absence of the VLAN header; and c) stripping, at destination nodes of the VLAN, the VLAN header from the frame and passing a remaining part of the frame to a software device driver arrangement, wherein the VLAN includes:

a) at least one device coupled to a phone line network; and b) at least one device coupled to a remote network, wherein the attaching the VLAN header is accomplished by a network medium interface device including a first physical layer device and a second physical layer device, wherein the first physical layer device is configured to communicate in accordance with a first Home Phoneline Networking Alliance (HPNA) specification, and wherein the second physical layer device is configured to communicate in accordance with a second HPNA specification.

9. The method of claim 8, wherein the VLAN identification information includes a 4-byte VLAN ID.

10. The method of claim 8, wherein the VLAN header includes the VLAN identification information in a VLAN ID and a VLAN tag.

11. A method of communicating within a virtual private network (VPN) including one remote LAN and one local area network (LAN) which include parts of a phone line LAN, the method comprising:

a) registering each node of the VPN to at least one VLAN by assigning a unique VLAN ID to each node;

b) attaching at a source node of a frame, a VLAN header to each frame to be communicated within a VLAN, the VLAN header containing identification information associated with the VLAN, wherein the VLAN header is inserted by a device driver into a frame header; and c) controlling communication at nodes of the specific VLAN by examining incoming frames for the presence or absence of the VLAN header associated with the specific VLAN; and d) stripping, at destination nodes of the specific VLAN, the VLAN header from the frame header and passing a remaining part of the frame to a software device driver arrangement;

whereby the frame to be communicated within the specific VLAN remains within the nodes of the specific VLAN, exclusively, wherein the attaching the VLAN hey is accomplished by a network medium interface device including a first physical layer device and a second physical layer device, wherein the first physical layer device is configured to communicate in accordance with a first Home Phoneline Networking Alliance (HPNA) specification, and wherein the second physical layer device is configured to communicate in accordance with a second HPNA specification.

12. The method of claim 11, wherein at least some of the nodes of the phone line LAN are configured to communicate in accordance with the first HPNA specification and at least some of the nodes of the phone line LAN are configured to communicate in accordance with the second HPNA specification.

* * * * *

UNITED STATES PATENT AND TRADEMARK OFFICE
CERTIFICATE OF CORRECTION

PATENT NO. : 6,894,999 B1
DATED : May 17, 2005
INVENTOR(S) : Acharya

It is certified that error appears in the above-identified patent and that said Letters Patent is hereby corrected as shown below:

Column 4,
Line 11, replace "VLAN an" with -- VLAN --

Column 10,
Line 34, replace "578 s a device-specific" with -- 578 is a device-specific --

Column 14,
Line 13, replace "VLANNPN" with -- VLAN/VPN --
Line 64, replace "dialup connections" with -- dial-up connections --

Column 16,
Line 49, replace "VLAN hey is" with -- VLAN header is --

Signed and Sealed this

Twelfth Day of July, 2005

JON W. DUDAS
*Director of the United States Patent and Trademark Office*